United States Patent
van der Stelt

[15] 3,666,811
[45] May 30, 1972

[54] N-[2-(DIPHENYLMETHOXY)ETHYL]-N-METHYLCINNAMYLAMINE AND THE SALTS THEREOF

[72] Inventor: Cornelis van der Stelt, Haarlem, Netherlands

[73] Assignee: N. V. Koninklijke Pharmaceutische Fabrieken v/h Brocades-Stheeman & Pharmacia, Amsterdam, Netherlands

[22] Filed: July 18, 1969

[21] Appl. No.: 843,170

[30] Foreign Application Priority Data

July 19, 1968  Great Britain .................... 34,700/68

[52] U.S. Cl. ............. 260/570 R, 260/501.18, 260/558 R, 260/566 R, 260/566 F, 260/567.6 M, 260/570.8, 260/570.9, 260/611 A, 260/618 B, 260/649 R, 260/649 F, 260/665 R, 424/329, 424/330

[51] Int. Cl. ............................................. C07c 93/08
[58] Field of Search ................... 260/570 R, 501.18

[56]  References Cited

UNITED STATES PATENTS 2,499,058   2/1950   Cusic ............................. 260/253
2,499,417   3/1950   Rieveschl et al. ............... 260/570 X

*Primary Examiner*—Robert V. Hines
*Attorney*—Robert E. Burns and Emmanuel J. Lobato

[57]  ABSTRACT

New diphenylmethoxyethylamino derivatives are provided in which the diphenyl group may contain halogen and lower alkyl substituents and in which the amino group may be a secondary or tertiary amino group having a phenyl-lower alkyl or a phenyl lower alkenyl substituent together with a hydrogen or lower-alkyl substituent. The new compounds have valuable therapeutic properties.

2 Claims, No Drawings

N-2-(DIPHENYLMETHOXY)ETHYL-N-METHYLCINNAMYLAMINE AND THE SALTS THEREOF

BACKGROUND OF THE INVENTION

This invention relates to new, therapeutically useful diphenylmethoxyethylamino derivatives, to processes for their preparation and pharmaceutical compositions containing them.

SUMMARY OF THE INVENTION

The new diphenylmethoxyethylamino derivatives of the invention are those of the general formula:

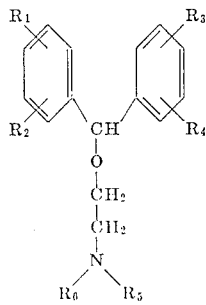

I wherein $R_1$, $R_2$, $R_3$ and $R_4$ are the same or different and each represents a hydrogen or halogen atom or a lower alkyl group, $R_5$ represents a hydrogen atom or a lower alkyl group and $R_6$ represents a phenyl-lower alkyl group or phenyl-lower alkenyl group in which the phenyl group may be substituted by one or more lower alkyl groups, and acid addition and quaternary ammonium salts thereof.

The ether of formula I have valuable therapeutic properties. They exhibit a dilating activity on the coronary blood vessels and they show, antihistaminic, antidepressive antiacetylcholinic, analgetic and muscolutropic spasmolytic activities.

DESCRIPTION OF THE PREFERRED EMBODIMENTS

Preferred ethers are those in which $R_1$, $R_2$, $R_3$ and $R_4$ are each a hydrogen atom or one or more of them are methyl groups or halogen atoms in ortho- or para-position and $R_6$ is a benzyl, cinnamyl or phenethyl group in which the phenyl nucleus may be substituted by a methyl group.

By the terms "lower alkyl" and "lower alkenyl" as used in this specification is meant straight or branched chain alkyl and alkenyl groups having at most six carbon atoms.

For use as therapeutics the compounds of formula I may be used as bases or as acid addition salts containing pharmaceutically acceptable non-toxic anions, e.g. the hydrohalides, sulphates, oxalates, tartrates, fumarates, acetates, citrates, maleates, succinates, lactates and pamoates.

According to a feature of the invention the compounds of formula I are prepared by reacting a benzhydrol of the formula:

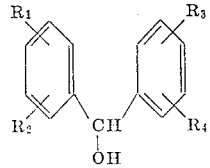

II wherein $R_1$, $R_2$, $R_3$ and $R_4$ are as hereinbefore defined, with an aminoalcohol of the formula

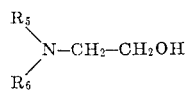

III wherein $R_5$ and $R_6$ are as hereinbefore defined.

For the preparation of compounds of formula I in which $R_5$ is a lower alkyl group, the reaction may also be carried out with a reactive ester of the benzhydrol of formula II, e.g. with a halide. When a reactive ester is used, it is preferred to use an excess of the aminoalcohol to bind the acid formed during the reaction. The reaction may also be performed by heating equimolar quantities of both reactants in the presence of a basic condensation agent, such as sodium carbonate or a tertiary amine (e.g. triethylamine), preferably in the presence of an inert organic solvent, for example benzene or toluene.

When a benzhydrol is used, the reaction is preferably carried out by heating the reactants in the presence of an acid that is not volatile at the reaction temperature, e.g. p-toluene sulphonic acid, under reduced pressure.

The aminoalcohol starting materials of formula III may be prepared by reacting a mono(lower alkyl)aminoethanol or aminoethanol with a compound of the formula:

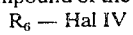

$R_6$ — Hal   IV wherein Hal represents a halogen atom and $R_6$ is as hereinbefore defined, preferably by heating the reactants in an inert organic solvent, such as benzene or toluene, in the presence of a base, e.g. sodium or potassium carbonate.

According to another feature of the invention, the compounds of formula I are prepared by converting a benzhydrol of formula II into an alkali metal derivative and reacting the latter with an amino compound of the formula:

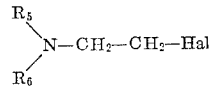

V wherein $R_5$, $R_6$ and Hal are as hereinbefore defined.

The conversion of the benzhydrol into the alkali metal derivative may be effected in manner known per se. The benzhydrol may, for example, be reacted with an alkali metal or an alkali metal hydride, dissolved or suspended in an inert organic solvent, eg. benzene or toluene or with an alkali metal alkoxide, e.g. sodium ethoxide, which is dissolved in an alcohol such as ethanol.

The starting materials of formula V may be prepared by replacing the hydroxyl group in an aminoalcohol of formula III by the desired halogen atom in a manner known per se, for example by reaction with a thionylhalide.

According to another feature of the invention, the compounds of formula I are prepared by reducing in manner known per se an amide of the formula:

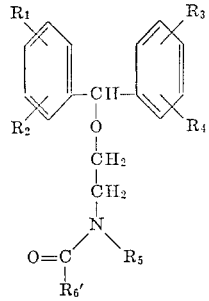

VI wherein $R_1$, $R_2$, $R_3$, $R_4$ and $R_5$ are as hereinbefore defined, and $R_{6'}$ is such that $R_{6'}$—$CH_2$— has the same meaning as $R_6$, $R_6$ being as hereinbefore defined. The reduction is advantageously effected by reaction of the amide, preferably dissolved in diethyl ether or tetrahydrofuran, with lithium aluminum hydride, followed by decomposition of the resultant complex compound with water.

The amide starting materials of formula VI may be prepared by reacting an acid halide of the formula:

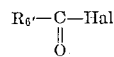

VII wherein $R_{6'}$ and Hal are as hereinbefore defined with an ether of the formula

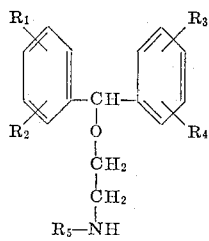

VIII wherein $R_1$, $R_2$, $R_3$, $R_4$ and $R_5$ are as hereinbefore defined. The reaction is preferably performed in an anhydrous, inert, organic solvent, such as toluene or xylene, preferably in the presence of a tertiary amine, e.g. triethylamine.

The ethers of formula VIII may be prepared from a benzhydrol of formula II or an alkali metal derivative thereof, with the use of the etherification reactions hereinbefore described.

According to another feature of the invention, the compounds for formula I are prepared by reacting a compound of the formula:

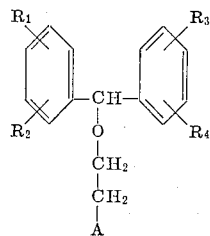

IX with a compound of the formula:

$$R_6 - B \qquad X$$

wherein $R_1$, $R_2$, $R_3$, $R_4$ and $R_6$ are as hereinbefore defined, one of the symbols A and B represents a halogen atom and the other a group of the formula $$\begin{array}{c} -NH \\ | \\ R_5 \end{array}$$

wherein $R_5$ is as hereinbefore defined. The reaction is preferably carried out in an inert organic solvent in the presence of an acid binding substance, for example sodium carbonate.

The starting materials of formula IX may be prepared by using the methods described for the preparation of the o-methyl-benzhydryl ethers in the specification of U.S. Pat. No. 3,407,258, which patent is incorporated herein by reference.

According to another feature of the invention, the compounds of formula I, wherein $R_5$ is an alkyl group and the other symbols are as hereinbefore defined, are prepared by alkylating in manner known per se the corresponding compounds in which $R_5$ is a hydrogen atom.

Methylation may, for example, be effected by reacting the secondary amine with formaldehyde with simultaneous catalytic hydrogenation, using, for example, Raney nickel or palladium as a catalyst. The reaction is preferably carried out in a solvent medium, for example in alcohol.

According to another feature of the invention, the compounds of formula I are prepared by reacting an ether of formula VIII with an aldehyde of the formula:

$$R_6{'}-CHO \qquad XI$$

wherein $R_6{'}$ is as hereinbefore defined and reducing the resultant compound. The reaction is preferably effected in an inert organic solvent medium. When $R_5$ in the ether starting material of formula VIII represents a hydrogen atom, an intermediate compound is obtained of the formula:

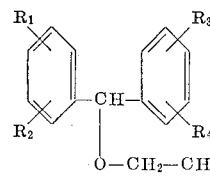

XII wherein the various R symbols are as hereinbefore defined. The reduction of the azomethine bond in this intermediate to the grouping —NH—CH$_2$— may be effected by methods known per se, preferably with reagents such as sodium borohydride. When $R_5$ represents a lower alkyl group, the compound of formula VIII is preferably reacted with the aldehyde of formula XI under reducing conditions, that are preferably achieved by a catalytic hydrogenation using, for example, Raney nickel as a catalyst.

Acid addition and quaternary ammonium salts of the ethers of formula I may be prepared by methods known per se. For example, the base may be treated with the equivalent amount of the acid in an inert solvent, to obtain the corresponding acid addition salt, or the base may be treated with the equivalent amount of an appropriate alkyl halide or dialkylsulphate in a solvent having high dielectric properties, for example acetonitrile, to obtain the quaternary ammonium salt.

By the term "methods known per se" as used in the specification is meant methods heretofore used or described in the literature.

The following examples further illustrate the best mode currently contemplated for carrying out the invention, however, these examples must not be construed as limiting the scope thereof in any manner whatsoever.

EXAMPLE 1

A mixture of 40.5 g. (0.2 mol.) of diphenylmethyl chloride and 71.6 g. (0.4 mol.) of 2-[methyl-(m-methylbenzyl)-amino] ethanol is heated slowly to 150° C.. At this temperature the reaction starts and the temperature rises to 160° C.. The heating is stopped, after which the temperature further rises to 185° C.. The mixture is cooled and then water and ether are added. The ethereal layer is separated, washed with water and extracted with a 0.25N aqueous solution of hydrogen chloride. The aqueous extract is make alkaline with sodium hydroxide and is then extracted with ether. The ethereal solution is washed with water and dried over sodium sulphate. After addition of an ethereal hydrogen chloride solution, the hydrochloride of N-(2-[diphenylmethoxy]ethyl)-N-methyl-m-methylbenzylamine precipitates. The compound is crystallized from a mixture of methanol, acetone and ether. Yield 59 g. (77%), melting point 146°–147° C.

Analysis
Calculated for
$C_{24}H_{28}NOCl$:     C: 75.46%    H: 7.39%    N: 3.67%
Found               :     C: 75.35%    H: 7.4%    N: 3.7%

2-[Methyl-(m-methylbenzyl)amino]ethanol, used as starting material, is prepared as follows:

A mixture of 147 g. of monomethylaminoethanol, 257 g. of potassium carbonate and 250 ml. of benzene is refluxed. In the course of one hour 262 g. of α-chloro-m-xylene (prepared according to M. S. Kharash and H. C. Brown, J. Am. Chem. Soc., 61, 2142 (1939)) are added to the refluxing mixture, after which refluxing is continued for another 3 hours. The reaction mixture is cooled and 1,250 ml. of water are added. The organic layer is separated, washed several times with water and extracted with 2N hydrochloric acid. The aqueous extract is made alkaline with sodium hydroxide and extracted with ether. The ethereal solution is dried over sodium sulphate and the solvent is evaporated. The residue is submitted to fractional distillation in vacuo. 260 g. of 2-[Methyl-(m-methylbenzyl)amino]ethanol are obtained. Yield 87%. Boiling point 131°–135°C./12 mm.Hg.

EXAMPLE 2

In a similar way as described in Example 1 the following compounds are obtained from the indicated starting compounds:

a. N-[2-(Di-2,6-xylylmethoxy)ethyl]-N-methyl-m-methyl-benzylamine hydrochloride from di(2,6-xylyl)methylchloride and 2-[methyl-(m-methylbenzyl)amino]ethanol. Yield 57%. Melting point 178°–179° C..

b. N-Methyl-N-[2-([o-methyl-α-phenylbenzyl]oxy)ethyl] benzylamine fumarate from o-methyl-α-phenylbenzyl chloride and benzylmethyl-aminoethanol. Yield 41%. Melting point 116°–118° C. For purification the base is first precipitated as the oxalate, which is afterwards converted into the fumarate. The latter salt is crystallized from a mixture of methanol and ether.

Analysis of the oxalate:
Calculated for
$C_{28}H_{29}NO_5$: C: 71.70% H: 6.71% N: 3.22%
Found : C: 71.3% H: 6.7% N: 3.2% c. N-[2-([o-Methyl-α-phenylbenzyl]oxy)ethyl]-N-m-methyl-benzylamine fumarate from o-methyl-α-phenylbenzyl chloride and 2-[methyl-(m-methylbenzyl)amino]ethanol. Yield 28%. Melting point 123.5°–125° C..
For purification the base is first precipitated as the oxalate, which is crystallized from a mixture of methanol and ether. The oxalate is then converted into the fumarate, which is also crystallized from a mixture of methanol and ether.

Analysis:
Calculated for
$C_{29}H_{33}NO_5$: C: 73.24% H: 6.99% N: 2.95%
Found : C: 73.2% H: 7.1% N: 3.0% d. N-[2-(p-Methyl-α-phenylbenzyl]oxy)ethyl]-N-methyl-m-methylbenzylamine fumarate from p-methyl-α-phenylbenzyl chloride and 2-[methyl-(m-methylbenzyl)amino]ethanol. Yield 31%. Melting point 116°–117° C.. The fumarate is obtained via the oxalate, as indicated in Example 2c.

Analysis:
Calculated for
$C_{29}H_{33}NO_5$: C: 73.24% H: 6.99% N: 2.95%
Found : C: 73.1% H: 7.1% N: 2.8% e. N-[2-([p-Chloro-α-phenylbenzyl]oxy)ethyl]-N-methyl-m-methyl-benzylamine hydrochloride from p-chloro-α-phenylbenzyl chloride and 2-[methyl-(m-methylbenzyl)amino] ethanol. Yield 30%. Melting point 116°–118° C.. The hydrochloride is obtained via the oxalate (cf. Example 2c). The salts are crystallized from a mixture of methanol and ether.
Analysis:
Calculated for
$C_{24}H_{27}NOCl_2$: C: 69.22% H: 6.54% N: 3.37%
Found : C: 69.2% H: 6.4% N: 3.3% f. N-[2-(Diphenylmethoxy)ethyl]-N-methylcinnamylamine fumarate from diphenylmethylchloride and 2-(cinnamyl-methyalmino)ethanol. Yield 50%. Melting point 94.5°–96.5° C.. The fumarate is obtained via the oxalate (cf. Example 2c). The salts are crystallized from a mixture of ethanol and ether.

Analysis:
Calculated for
$C_{29}H_{31}NO_5$: C: 73.55% H: 6.60% N: 2.96%
Found : C: 73.4% H: 6.6% N: 2.8% g. N-[2-([p-methyl-α-phenylbenzyl]oxy)ethyl]-N-methyl-cinnamylamine maleate from p-methyl-α-phenylbenzyl chloride and 2-(cinnamylmethylamino)ethanol. Yield 60%. Melting point 86°–88° C.. The salt is crystallized from a mixture of ethanol and ether.

Analysis:
Calculated for
$C_{30}H_{33}NO_5$: C: 73.90% H: 6.82% N: 2.87%
Found : C: 74.05% H: 6.9% N: 3.0% h. N-[2-([p-Chloro-α-phenylbenzyl]oxy)ethyl]-N-methylcinnamylamine maleate from p-chloro-α-phenylbenzyl chloride and 2-(cinnamylmethylamino)ethanol. Yield 60%. Melting point 115°–117°C.. The salt is crystallized from a mixture of ethanol and ether.

Analysis:
Calculated for
$C_{29}H_{30}NOCl$: C: 68.56% H: 5.95% N: 2.76%
Found : C: 68.4% H: 5.9% N: 2.8% i. N-[2-(Bis[p-chlorophenyl]methoxy)ethyl]-N-methyl-m-methylbenzylamine maleate from bis(p-chlorophenyl)-methylchloride and 2-[N-methyl(m-methylbenzyl)amino]-ethanol. Yield 60%. Melting point 104°–105° C.. The salt is crystallized from ethanol.

Analysis:
Calculated for
$C_{28}H_{29}NO_5Cl_2$: C: 63.40% H: 5.52% N: 2.64%
Found : C: 63.48% H: 5.55% N: 2.57% j. N-[2-(Bis[p-chlorophenyl]methoxy)ethyl]-N-methylcinnamylamine maleate from bis(p-chlorophenyl)methylchloride and 2-(cinnamyl-methylamino)ethanol. Yield 75%. Melting point 124°–125° C.. The salt is crystallized from isopropanol.

Analysis:
Calculated for
$C_{29}H_{29}NO_5Cl_2$: C: 64.21% H: 5.39% N: 2.58%
Found : C: 64.34% H: 5.44% N: 2.51% k. N-[2-(Bis[p-fluorophenyl]methoxy)ethyl]-N-methyl-m-methylbenzylamine maleate from bis(p-fluorophenyl)methylchloride and 2-[N-methyl-(m-methylbenzyl)amino]ethanol. Yield 51%. Melting point 97°–98.5°C.. The salt is crystallized from a mixture of ethanol and diethyl ether.

Analysis:
Calculated for
$C_{28}H_{29}NO_5F_2$: C: 67.59% H: 5.87% N: 2.81%
Found : C: 67.66% H: 5.97% N: 2.77% l. N-[2-(Bis[p-fluorophenyl]methoxy)ethyl]-N-methylcinnamylamine oxalate from bis(p-fluorophenyl)methylchloride and 2-(cinnamyl-methylamino)ethanol. Yield 57%. Melting point 129°–131° C. The salt is crystallized from acetone.

Analysis:
Calculated for
$C_{27}H_{27}NO_5F_2$: C: 67.07% H: 5.63% N: 2.90%
Found : C: 67.09% H: 5.65% N: 2.98%

2-(Cinnamyl-methylamino)ethanol mentioned as a starting material under (f), (g), (h), (j) and (l) is prepared as follows:
59.5 g. of 2-(cinnamylamino)ethanol and 30 ml. of 36 percent formaldehyde are added dropwise after each other to 51 ml. of 90percent stirred and cooled formic acid. The reaction mixture is heated to ca 65° C.. At this temperature evolution of carbon dioxide starts and the temperature rises without further heating to 80° C.. The reaction is continued for 2 hours at 100° C.. The reaction mixture is then diluted with 80 ml. of 4N hydrochloric acid and the excesses of formaldehyde and formic acid are distilled off. The residue is made alkaline with sodium hydroxide and extracted with ether. The ether layer is separated and concentrated, and the residue is distilled. Yield 90%. Boiling point 116° C./0.2 mm.Hg.

Analysis:
Calculated for
$C_{12}H_{17}NO$: C: 75.35%  H: 8.96%  N: 7.32%
Found         : C: 75.2%   H: 9.1%   N: 7.3%

EXAMPLE 3

5.5 g. (0.03 mol) of benzhydrol are dissolved in 50 ml. of xylene and then 1.5 g. (0.03 mol) of 50 percent sodium hydride are added in small amounts. The mixture obtained is refluxed for 1 hour, after which 5 g. of N-[2-chloroethyl)]-N-methyl-m-methylbenzylamine is added at once. After 5 hours of refluxing, the xylene layer is extracted twice with water, dried over sodium sulphate and concentrated. The crude oily residue is dissolved in ether and converted into the hydrochloride of N-[2-(diphenylmethoxy) ethyl]-N-methyl-m-methylbenzylamine by adding an ethereal hydrogen chloride solution. Crystallization from a mixture of isopropanol and ether yields 7 g. of the end product. Yield 61%. Melting point 145°–147° C..

The N-(2-chloroethyl)-N-methyl-m-methylbenzylamine, used as a starting material in the above reaction, is prepared as follows:

A solution of 27 g. of 2-[methyl-(m-methylbenzyl)amino]-ethanol (prepared as described in Example 1) in 100 ml. of chloroform is saturated with gaseous hydrogen chloride. Then 30 ml. of thionyl chloride are added dropwise. The reaction mixture is refluxed for 1 hour. The mixture is then cooled and diluted with a large amount of ether which causes the crude N-(2-chloroethyl)-N-methyl-m-methylbenzylamine hydrochloride to crystallize. The compound is recrystallized from a mixture of acetonitrile and ether. Yield 33 g. (91%). Melting point 148°–150° C..

Analysis:
Calculated for
$C_{11}H_{17}NCl_2$: C: 56.41%  H: 7.32%  N: 5.98%
Found          : C: 56.3%   H: 7.2%   N: 6.1%

EXAMPLE 4

A solution of 21.5 g. of crude N-[2-(diphenylmethoxy)-ethyl]-N-methyl-2-phenylacetamide in 150 ml. of dry tetrahydrofuran is added dropwise to a suspension of 3.8 g. of lithium aluminum hydride in 25 ml. of dry tetrahydrofuran. After 3 hours of refluxing, the reaction mixture is decomposed with water and cooling, and the precipitated hydroxides are removed by filtration. The filtrate is concentrated and the residue is dissolved in ether. The solution obtained is washed with water until it is neutral and then dried over sodium sulphate. On addition of an ethereal hydrogen chloride solution, N-[2-(diphenylmethoxy)ethyl]-N-methylphenethylamine hydrochloride precipitates. To remove 2-(diphenylmethoxy)-Ndmethylethylamine, present as a contaminant (which can be detected by means of titration and thin layer chromatography), the free base is treated with phthalic anhydride in toluene. The hydrochloride is crystallized from a mixture of acetone and ether. Yield 60%. Melting point 125°–127.5° C..

Analysis:
Calculated for
$C_{24}H_{28}NOCl$: C: 75.48%  H: 7.39%  N: 3.67%
Found          : C: 75.3%   H: 7.2%   N: 3.65%

N-[2-(Diphenylmethoxy)ethyl]-N-methyl-2-phenylacetamide, used as starting material in the above process, is prepared as follows:

A solution of 34 g. of phenylacetic acid in 50 ml. of thionylchloride is refluxed for half an hour. After evaporation of the excess thionyl chloride, 23 g. of the residue are dissolved in 50 ml. of dry toluene. The solution is added dropwise to a solution of 36 g. of 2-(diphenylmethoxy)-N-methylethylamine and 20 g. of triethylamine in 100 ml. of dry toluene. The reaction mixture is consecutively washed with water, 2N hydrochloric acid and water. The organic layer is dried and concentrated. The residue is distilled; yield 1.5 g., boiling point ca. 200°C./0.02mm.Hg.. A second distillation yields 16 g., boiling point 230°–240° C./0.01 mm.Hg..

Analysis:
Calculated for
$C_{24}H_{25}NO_2$: C: 80.19%  H: 7.01%  N: 3.90%
Found          : C: 80.1%   H: 6.9%   N: 4.2%

EXAMPLE 5

13.2 g. (0.1 mol.) of cinnamic aldehyde are added to 22.7 g. (0.1 mol.) of 2-[diphenylmethoxy]ethylamine in 500 ml. of benzene. Then 25 g. of anhydrous sodium sulphate are added to remove the water formed. After standing for 48 hours at room temperature, the reaction mixture is concentrated and the residue, consisting of crude N-cinnamylidene-2-(diphenylmethoxy)ethylamine is dissolved in 300 ml. of isopropanol.

2.5 g. Of sodium borohydride are added to the solution at a temperature of 20°–30°C.. The reaction mixture is refluxed for one hour, concentrated and diluted with water and ether. The ether layer is separated and dried over sodium sulphate, after which the calculated amount of fumaric acid in ethanol is added, which causes N-[2-(diphenylmethoxy)ethyl]cinnamylamine fumarate to precipitate. The product is crystallized from a mixture of ethanol and ether. Yield 25%. Melting point 151°–152° C..

Analysis:
Calculated for
$C_{28}H_{29}NO_5$: C: 73.18%  H: 6.36%  N: 3.05%
Found          : C: 73.0%   H: 6.4%   N: 2.95%

EXAMPLE 6

A mixture of 37.8 g. (0.157 mole.) of 2-[(o-methyl-α-phenylbenzyl)oxy]ethylamine, 22.0 g. (0.157 mol.) of α-chloro-m-xylene, 12.4 g. (0.157 mol.) of pyridine and 61 ml. of xylene is refluxed for 8 hours. After being cooled, the mixture is poured into water. Ether is added and the organic layer is separated and dried and the solvent is evaporated. According to the NMR spectrum the crude oil obtained is a mixture of the amine starting compound, the desired compound (N-[2-[(o-methyl-α-phenylbenzyl)oxy]ethyl]-m-methylbenzylamine) and the corresponding tertiary amine. The compounds are separated by fractional distillation. A fraction of 10 g. with boiling point of 180° C./0.01 mm.Hg. is obtained, giving a single spot in the thin-layer chromatogram and consisting of the desired base. The base is converted into the maleate by addition of a solution of maleic acid in anhydrous ether. The salt after crystallization from a mixture of methanol and ether melts at 106°–108°C..

Analysis:
Calculated for
$C_{28}H_{31}NO_5$: C: 72.86%  H: 6.77%  N: 3.03%
Found          : C: 73.0%   H: 6.9%   N: 2.9%

EXAMPLE 7

A mixture of 0.85 g. (0.0025 ml.) of N-[2-([o-methyl-α-phenylbenzyl]oxy)ethyl-m-methylbenzylamine (prepared as described in Example 6), 20 ml. of ethanol, 0.2 ml. of 36 percent formaldehyde is reduced under a pressure of 1 atm. and at room temperature with hydrogen and Raney nickel. When the calculated amount of hydrogen is taken up the reaction mixture is filtered and the filtrate is concentrated by evaporation of solvent. According to the NMR spectrum the residue is N - [2 - ([o - methyl - α - phenylbenzyl] - oxy)ethyl] - N-methyl-m-methylbenzylamine (also prepared according to Example 2c). Yield ca. 80%.

The ether referred to in the foregoing examples is diethyl ether.

The invention includes within its scope pharmaceutical preparations containing, as the active ingredient, at least one of the therapeutically active compounds of formula I, or nontoxic acid addition or quaternary ammonium salt thereof in association with a pharmaceutically acceptable carrier. The preparations may take any of the forms customarily employed for administration of therapeutically active substances, but the preferred types are those suitable for oral administration and especially tablets, including sustained release tablets, pills and capsules including the substance. The tablets and pills may be formulated in the usual manner with one or more pharmaceutically acceptable diluents or excipients, for example lactose or starch, and include materials of a lubricating nature, for example calcium or magnesium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The actve substance may also be made up in a form suitable for parenteral administration, i.e. as a suspension or emulsion in sterile water or an organic liquid usually employed for injectable preparations, for example a vegetable oil such as olive oil, or a sterile solution in water or an organic solvent. For analeptic purposes a solution of a compound according to the invention may be administered intravenously to animals and humans. Suitable daily dosages for humans are from 0.005 to 0.2 ml. of a 10 percent solution per kg. weight. For animals the dose range is 0.01 to 0.4 ml. of a 10 percent solution per kg. weight.

As coronary dilating agents, antidepressants antihistaminics, antiacetylcholinics, analgetics and musculotropic spasmolytics the compounds may be administered to humans. To adult human beings the compounds may be given orally in doses of 25 to 150 mg., 1 to 3 times per day.

Example 8 illustrates a pharmaceutical preparation according to the invention.

EXAMPLE 8

50 g. of N-[2-(diphenylmethoxy)ethyl]-N-methyl-m-methylbenzylamine hydrochloride,
    33 g. of saccharis lactis,
    87 g. of amylum and
    10 g. of polyvinylpyrrolidone
are mixed and granulated with ethanol. The granulate is dried and mixed with 14 g. of amylum and 6 g. of a mixture of 8 parts of talcum, 1 part of aerosil and 1 part of magnesium stearate. The mixture is then compressed into tablets of 200 mg., each containing 50 mg. of the active substance.

What I claim and desire to secure by letters patent is:

1. A compound selected from N-[2-(diphenylmeth-oxy)ethyl]-N-methylcinnamylamine and its pharmaceutically acceptable acid addition salts.

2. A compound according to claim 1 which is N-[2-(diphenylmethoxy)ethyl]-N-methylcinnamylamine.

* * * * *